July 22, 1969 W. E. BEIFUSS 3,456,859
DEVICE FOR FEEDING STRIP MATERIAL
Filed May 8, 1967 9 Sheets-Sheet 3
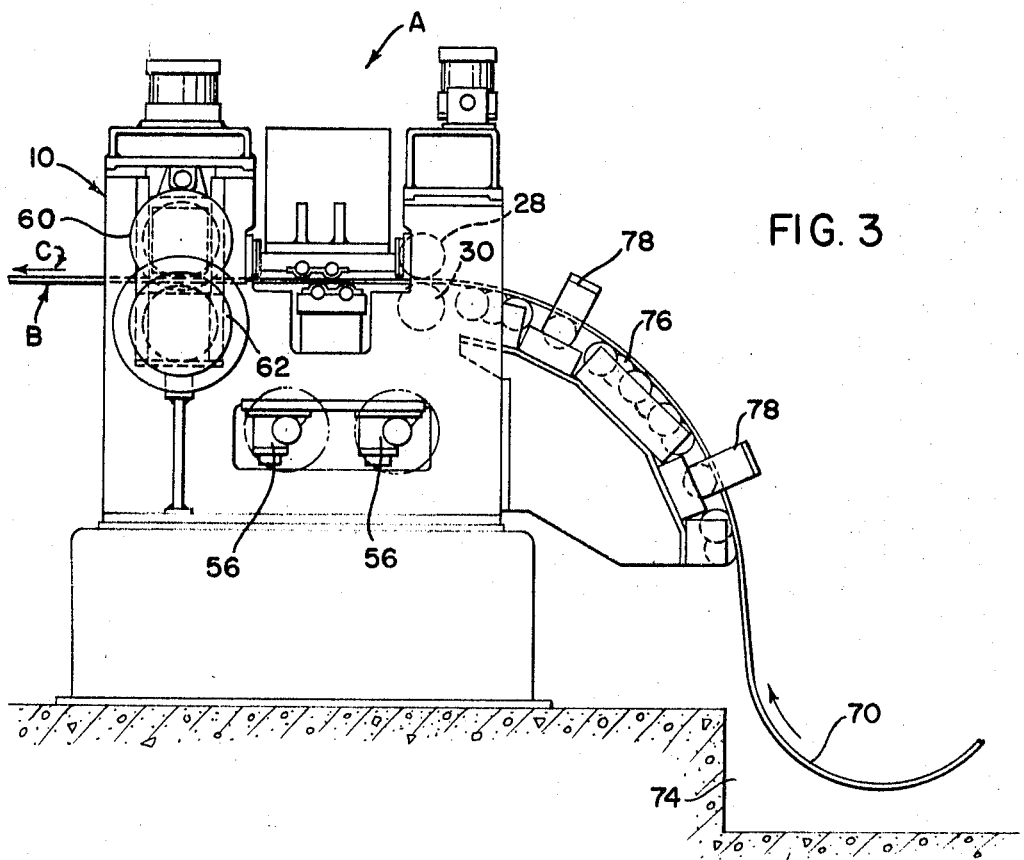
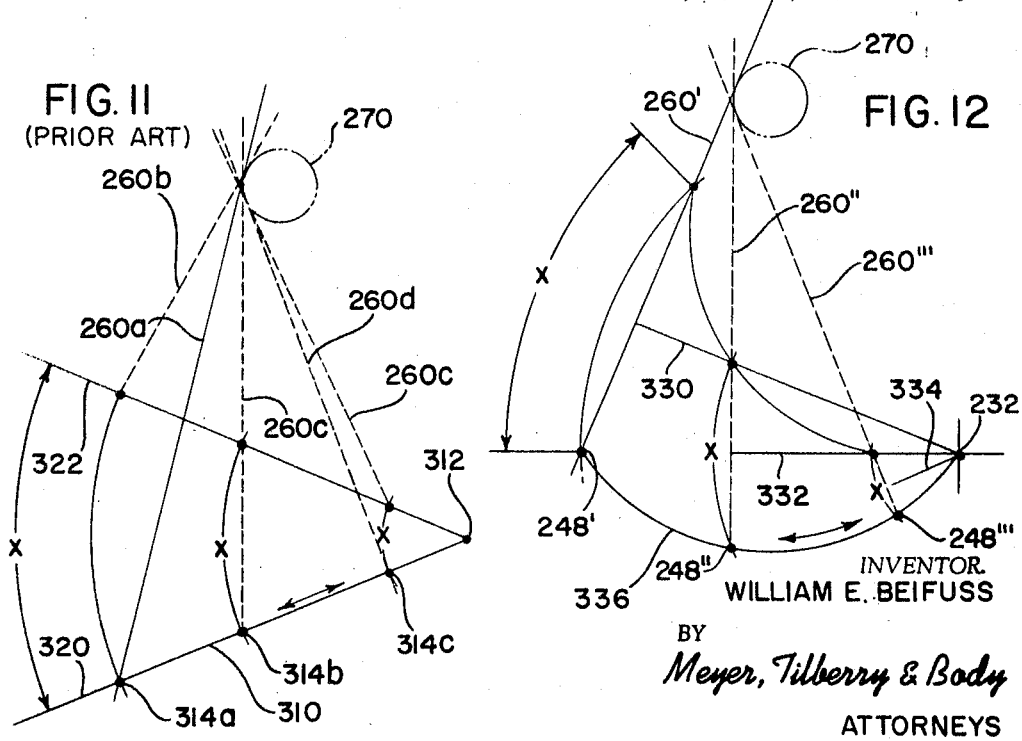
INVENTOR.
WILLIAM E. BEIFUSS
BY
Meyer, Tilberry & Body
ATTORNEYS

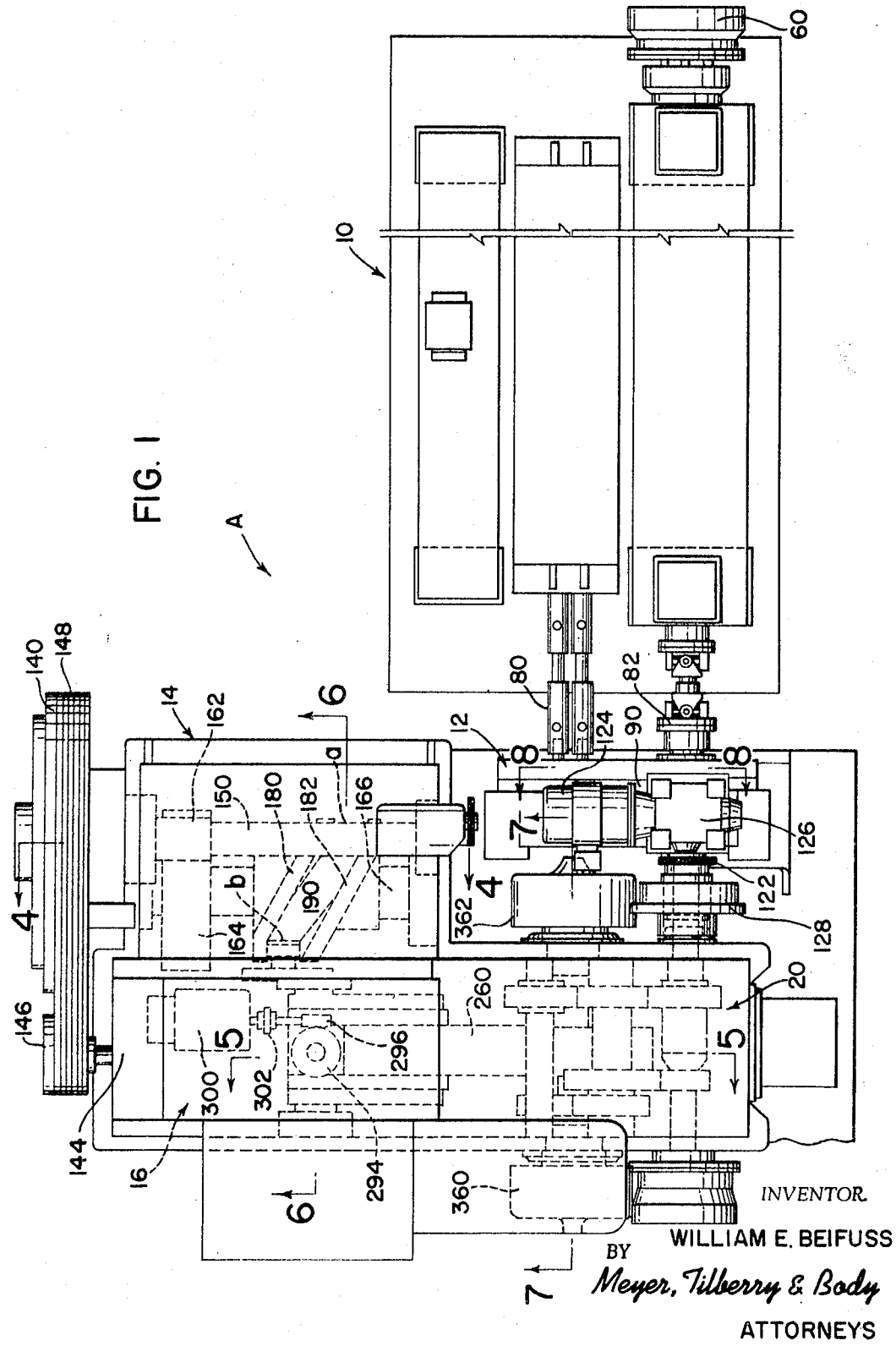

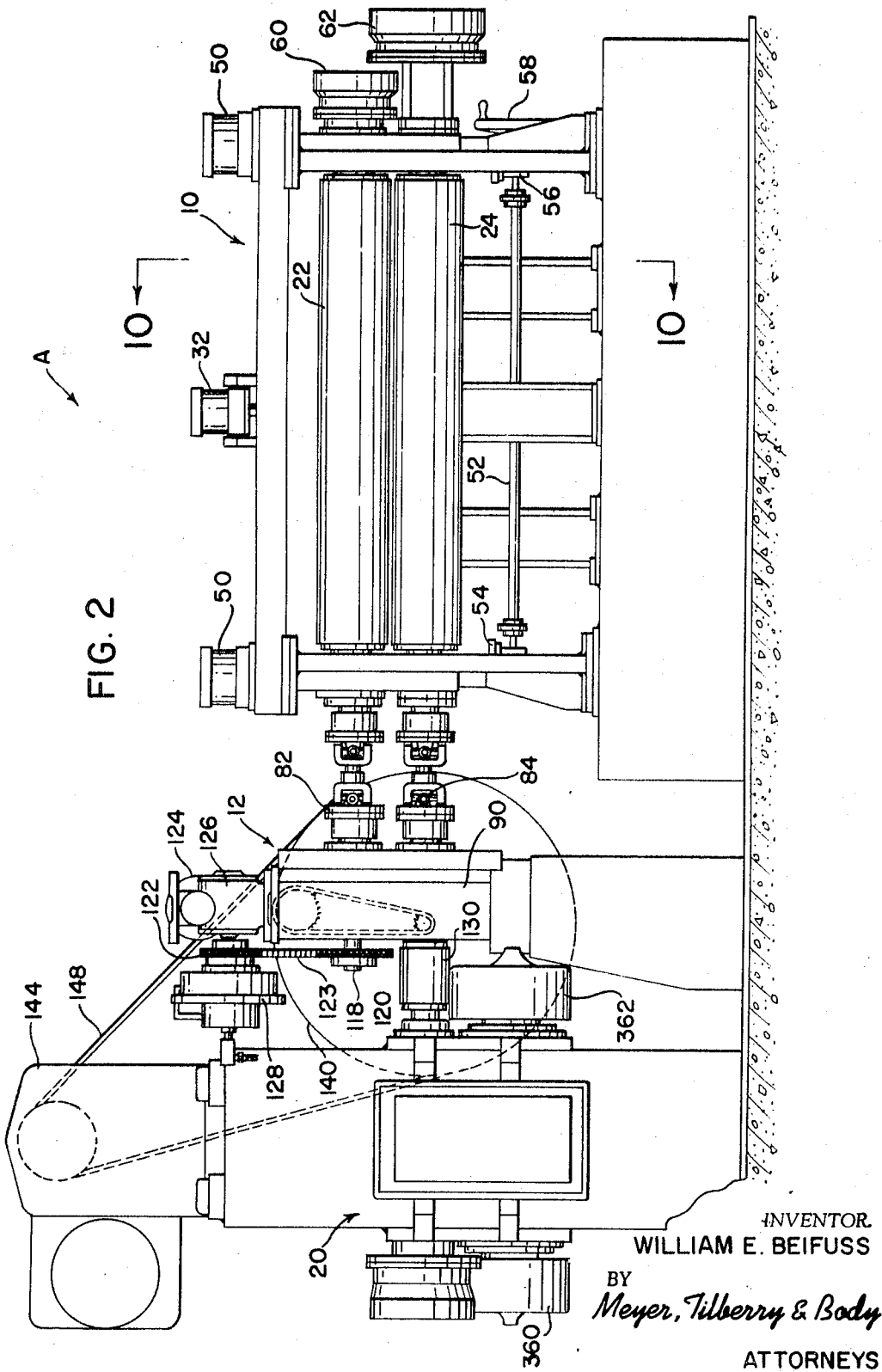

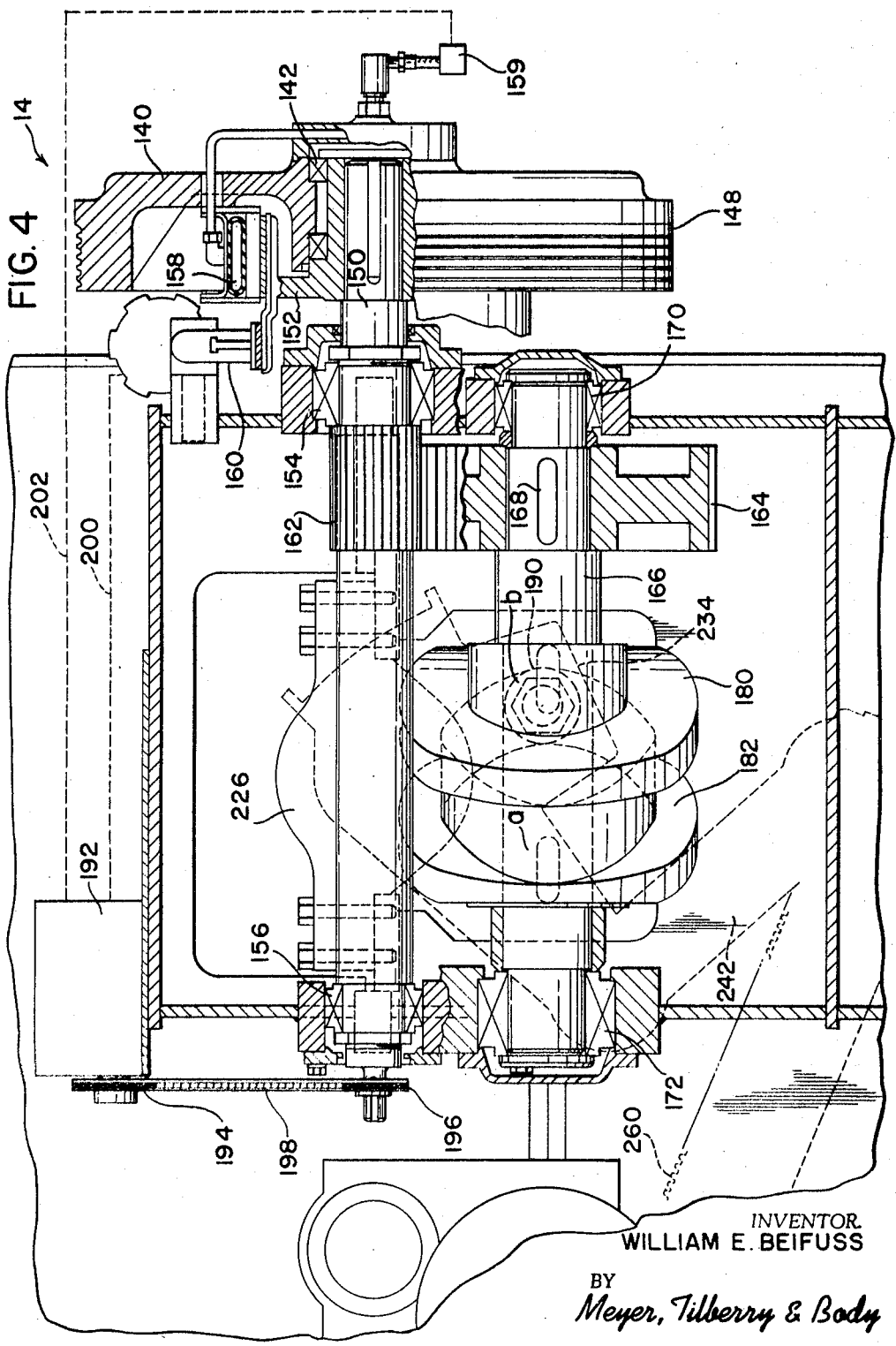

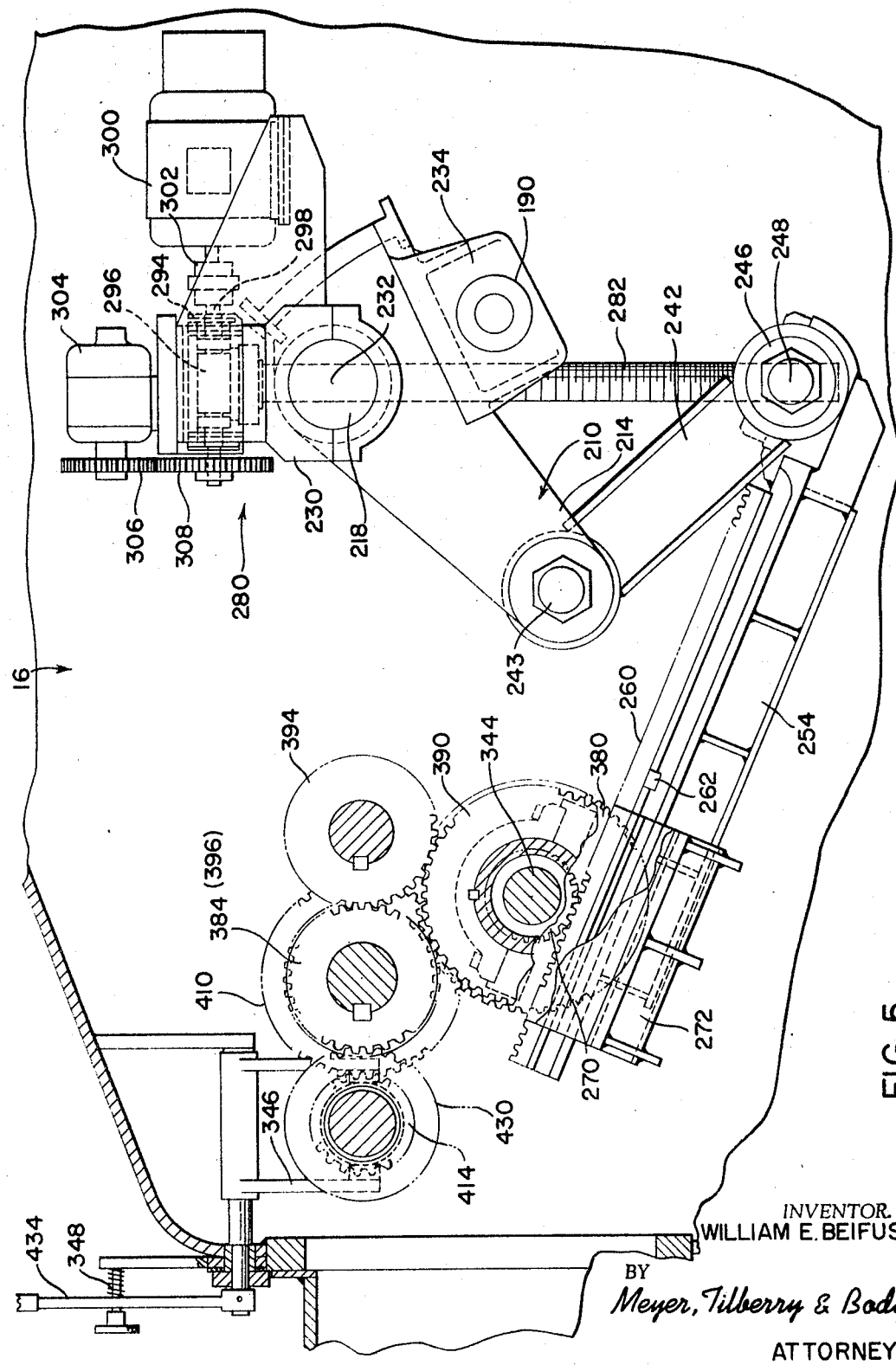

July 22, 1969 W. E. BEIFUSS 3,456,859
DEVICE FOR FEEDING STRIP MATERIAL
Filed May 8, 1967 9 Sheets-Sheet 6

INVENTOR.
WILLIAM E. BEIFUSS
BY
Meyer, Tilberry & Body
ATTORNEYS

July 22, 1969    W. E. BEIFUSS    3,456,859

DEVICE FOR FEEDING STRIP MATERIAL

Filed May 8, 1967    9 Sheets-Sheet 7

INVENTOR.
WILLIAM E. BEIFUSS

BY
*Meyer, Tilberry & Body*

ATTORNEYS

July 22, 1969 W. E. BEIFUSS 3,456,859
DEVICE FOR FEEDING STRIP MATERIAL
Filed May 8, 1967 9 Sheets-Sheet 8
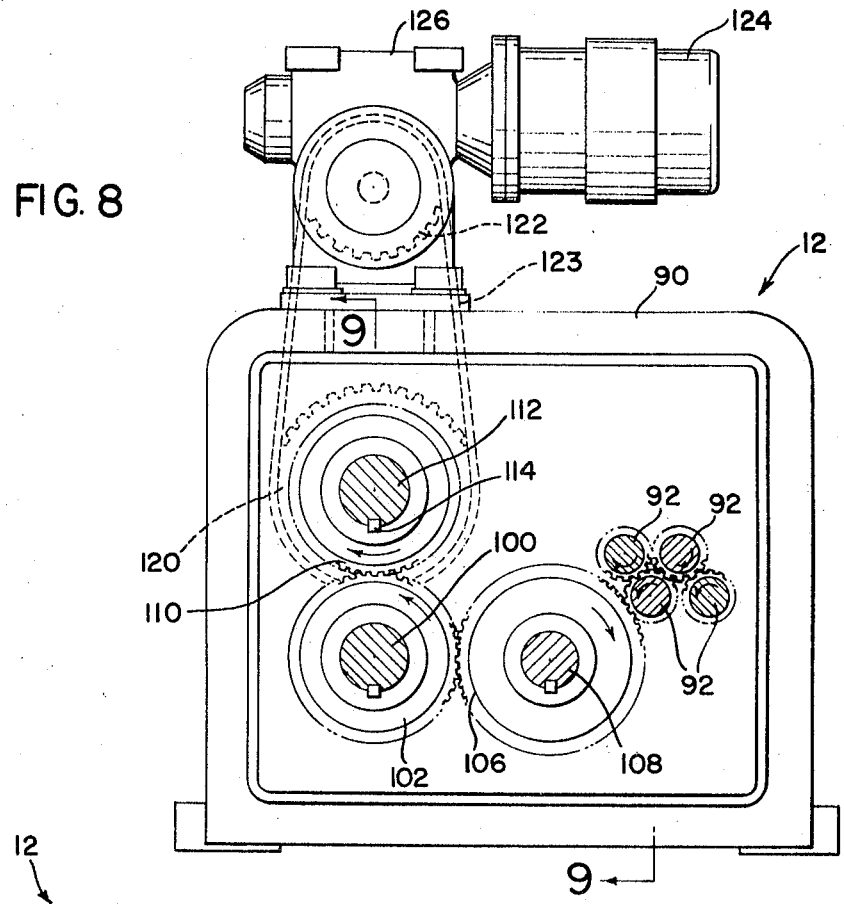
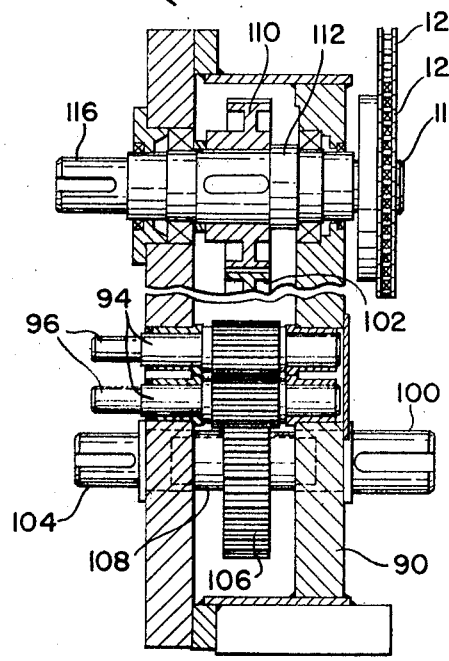
INVENTOR.
WILLIAM E. BEIFUSS
BY
Meyer, Tilberry & Body
ATTORNEYS July 22, 1969  W. E. BEIFUSS  3,456,859
DEVICE FOR FEEDING STRIP MATERIAL
Filed May 8, 1967  9 Sheets-Sheet 9

INVENTOR.
WILLIAM E. BEIFUSS
BY
Meyer, Tilberry & Body
ATTORNEYS

United States Patent Office 3,456,859
Patented July 22, 1969

3,456,859
DEVICE FOR FEEDING STRIP MATERIAL
William E. Beifuss, Willowick, Ohio, assignor to Production Machinery Corporation, Mentor, Ohio, a corporation of Ohio
Filed May 8, 1967, Ser. No. 636,763
Int. Cl. B65h 17/22
U.S. Cl. 226—142    14 Claims

ABSTRACT OF THE DISCLOSURE

A device for feeding metal strip into a power press, or a similar process machine, which device includes an oscillating lever system forming the essential feed mechanism. This lever system has an adjustable driving element which is movable in a controlled arc instead of a straight line on the lever system so that the drive motion is uniform over wide ranges of adjusted feeding amounts. In addition, this feeding device includes a drive mechanism which allows feeding in a single direction upon each swing or oscillation of the lever system in opposite directions.

This invention pertains to the art of feeding strip material and more particularly to a device for feeding strip material.

The invention is particularly applicable for feeding strip material into a power press, and it will be described with particular reference thereto; however, it will be appreciated that the invention has much broader applications and may be used for feeding strip materials into other similar processing equipment.

In feeding strip into a power press, the length of the strip fed must be accurately controlled. In some instances, the strip must be released after each feeding stroke to allow location of the strip within the press before the forming or stamping dies of the press come together. A wide variety of feeding devices has been suggested for performing these functions; however, each of these prior devices has had certain disadvantages, especially when the strip being fed was relatively wide or the length of the feeding stroke was relatively long. It is common to feed strip having a width exceeding three feet and a feeding stroke exceeding three feet.

One common device for feeding strip into a power press is attached, as an accessory, onto the press itself. The driving power for the feeding device is received from the press, usually by a pitman arm driven by the power shaft of the press. These devices generally include a pair of driving rolls or driving blocks rotated or reciprocated by the drive shaft of the press. Such press driven feeding devices are relatively successful for narrow strip and short feeding strokes; however, their driving power is not adapted for wide strip or long strokes. In addition, since the feed mechanism is tied directly to the press, very little flexibility in the feeding is possible. The feeding is determined by the operation of the movement of the press ram itself.

To overcome these disadvantages of press mounted feeding devices, it has been suggested to provide a separately driven feeding device for wide strip. These devices are located adjacent the intake side of a power press, and they are driven by a separate electric motor mounted on the feeding device. The most successful of these separately mounted feeding devices has included an adjustable lever system which is oscillated back and forth by an electric motor through an appropriate drive arrangement. A pinion is driven by a rack reciprocated in accordance with the movement of the lever system. In devices of this type, the rack is moved forward to feed strip through an appropriate drive train as the lever system is oscillated in a first direction. The length of feed is determined by the effective length of the lever system, which may be adjusted by external means. When the lever system is oscillated in the second, or opposite direction, no feeding takes place and the rack is pulled back into a position preparatory to a subsequent feeding stroke. The time required to retract the rack is unused time in the operation of the feeding device. Consequently, this retracting time distracts from the feeding time.

To accomplish rapid feeding, which is required by present press production rates, such prior separately mounted feeding devices have had to operate at high speeds. These high speeds created substantial inertia forces throughout the various drive trains and components of the feeding device. To absorb these inertia forces, the components of the feeding device had to be relatively large. This, in turn, increases the inertia forces of the moving mechanisms in the feeding device. Because of the inertia problems and the resultant inaccuracies created thereby, the production of the press was often determined by the feeding capacity of the feeding device, which may be slower than the capacity of the press itself.

These prior most successful separately mounted feeding devices adjust the amount of the feeding stroke by adjusting the length of a lever within the lever system. Since this lever controls the reciprocated rack, two inherent disadvantages are created. First, the effective length of the adjustable lever is not a straight line function of the resulting feed stroke. Consequently, non-linear scales must be used to determine the feeding stroke being accomplished. Also, with these prior devices there is only one length of the adjustable lever which will reciprocate the rack by a force generally applied perpendicular to the rack and the pinion gear which the rack rotates. In all other instances, a non-perpendicularity is created which increases certain stresses within the lever driving system. This non-perpendicularity also distorts the feeding velocity curve by giving a last rolling action of the rack over the pinion.

All of these disadvantages of the prior, most successful separately mounted strip feeding device are overcome by the present invention which is directed toward an apparatus for feeding relatively wide strip at a speed heretofore not easily obtainable and with optimum geometric relationship between the various feeding mechanisms within the feed device itself.

In accordance with the present invention there is provided an improvement in a device for feeding strip in rapdily repeating feed distances or strokes along a feed line, which device includes two spaced feed members with one on each side of the strip, the strip being frictionally engaged by these members. This device includes means for repeatedly driving the feed members a given distance to feed the trip and means for adjusting this given distance to adjust the feed distance or stroke of the device. The improvement to this device includes providing the above-mentioned driving means as a driven rotatable element, means for drivingly connecting this element with the feed members whereby rotation of the element through a given angle drives the members a given distance corresponding to the feed distance, a lever system including a fixed pivot, a movable pivot, means for adjusting the movable pivot along an arcuate path with respect to the fixed pivot to change the effective lever arm of the lever system to change the feed distances of the feed device, means for oscillating the lever system about the fixed pivot whereby the movable pivot moves through an arc dependent upon the lever arm of the lever system, and means for driving the driven rotatable element by the movable pivot a distance dependent upon the arc of the movable pivot on each oscillation of the lever system.

In accordance with another aspect of the present invention there is provided an improvement in a device of the type defined above which improvement includes the provision of a driving means including a driven first element, means for driving the first element successively in opposite directions a selected distance corresponding to the given feed distance, a second element drivingly connected to the feed members, a forward drive train, a reverse drive train, and means for selectively interposing the forward and reverse drive trains between the first and second elements in accordance with the direction of movement of the first element whereby the second element repeatedly moves in the same direction.

The primary object of the present invention is the provision of a strip feeding device which is positive, rapid and accurate in operation, easily adjusted, and adapted for use with a variety of strip processing equipment.

Another object of the present invention is the provision of a strip feeding device which includes a lever system as a drive component with the lever system being adjustable to provide various feeding strokes while maintaining optimum forces and non-distortion of the velocity curve, irrespective of the feeding stroke being used.

Another object of the present invention is the provision of a strip feeding device which includes a driving element oscillating back and forth with a similar, unidirectional feed stroke being accomplished on each oscillation of the driving element.

These and other objects and advantages will become apparent from the following description used to illustrate thep referred embodiment of the invention in connection with the accompanying drawings in which:

FIGURE 1 is a top view illustrating, somewhat schematically, thep referred embodiment of the present invention;

FIGURE 2 is a front elevational view illustrating the embodiment of the invention shown in FIGURE 1.

FIGURE 3 is a side elevational view of the preferred embodiment of the present invention;

FIGURE 4 is an enlarged, cross-sectional view taken generally along line 4—4 of FIGURE 1;

FIGURE 5 is an enlarged, cross-sectional view taken generally along line 5—5 of FIGURE 1;

FIGURE 8 is an enlarged, cross-sectional view taken generally along line 8—8 of FIGURE 1;

FIGURE 9 is a partial cross-sectional view taken generally along line 9—9 of FIGURE 1;

FIGURE 11 is a geometric graph of a prior are device;

FIGURE 12 is a geogratric graph, similar to FIGURE 11, illustrating operating characteristics of the present invention; and, FIGURE 13 is a velocity curve illustrating a further operating characteristic of the present invention.

Figure 10:
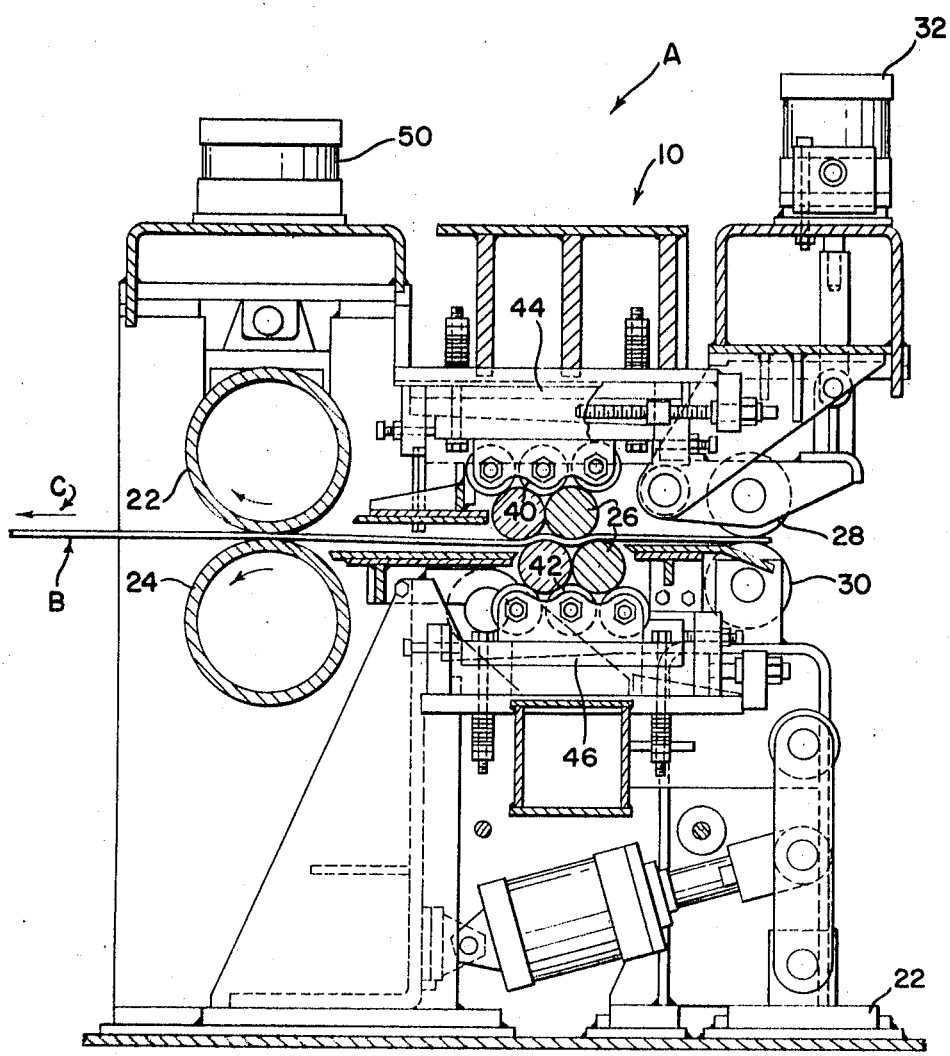
FIGURE 10 is a cross-sectional view taken generally along line 10—10 of FIGURE 2.

Referring now to the drawings wherein the showings are for the purpose of illustrating a preferred embodiment of the invention only and not for the purpose of limiting same, the figures illustrate a strip feeding device A adapted for feeding a relatively wide strip B into a subsequent processing machine, not shown, along a feed line C, shown in FIGURES 3 and 10. The strip feeding device includes, as basic components, a feed stand 10, shown in various figures, a stand drive unit 12, best shown in FIGURES 8 and 9, a cam drive unit 14, best shown in FIGURES 4 and 6, a lever system 16, best shown in FIGURES 5 and 6, and a selective driving unit 20, best shown in FIGURE 7. Each of these components will be described separately, and their overall function and cooperation will be apparent from this description.

Referring now more particularly to the feed stand 10, this stand is somewhat conventional in construction and utilizes a plurality of components which coact in a manner quite obvious from the figures; therefore, only certain of the operating components will be described in detail. This description will make the operation of the stand and its contribution to the total structure of the present invention quite obvious. Stand 10 includes spaced feed rolls 22, 24, best shown in FIGURES 2, 3 and 10, and a plurality of staggered leveler rolls 26. The feed rolls pull strip B through the leveler rolls, which are also driven, to straighten the strip before it is fed into a subsequent machine. The feed rolls frictionally engage the strip and feed the strip in accordance with the amount of rotation of the feed rolls in a direction indicated by the arrows in FIGURE 10. The inlet side of device A includes anti-back-up rolls 28, 30 which prevent reverse motion of the strip. A mechanism 32 is utilized for separating anti-back-up rolls 28, 30 during the threading operation of apparatus A. Pressure is applied to the leveler rolls by back-up pressure rolls 40, 42 through an appropriate pressure applying mechanism such as camming mechanisms 44, 46.

A hydraulic cylinder 50 periodically raises feed roll 22 from feed roll 24 upon an appropriate signal. In certain forming or stamping opeartions, the strip B is processed through a series of press operations; therefore, during the opeartion of the press, the strip must be accurately located in various dies. This could not be done if rolls 22, 24 were holding the strip in a given position. Consequently, the lift 50 is actuated between successive feeding operations so that the strip B is somewhat free to float and be located within the various dies forming the strip B.

As shown in FIGURE 2, two lower control rods 52 (only one of which is shown) are used to control spaced jacks 54, 56 by rotation of a handle 58. These jacks are used for locating the various components of apparatus A with respect to the nip of feed rolls 22, 24. Of course, appropriate projecting means can be provided for adjusting the position of lower feed roll 24 to change the location of the feed roll nip with respect to subsequent processing equipment. Between feeding operations, the feed rolls should not rotate and the inertia of these rolls, which is relatively large, should not cause over-riding of the rolls after the feeding cycle has been completed. Otherwise, certain inaccuracies and inconsistencies would be realized in the feeding operation. To overcome this problem, each of the feed rolls is provided with a brake 60, 62 which are sequentially actuated to stop the rotation of the feed rolls after they are positively driven during the feeding stroke or cycle.

As shown in FIGURE 3, a free hanging loop 70 is provided at the inlet of apparatus A; and, from this loop, the strip B is threaded over guide rolls 76 and between guides 78 into the apparatus A through the rolls 28, 30. Leveler rolls 26 are driven by a plurality of drive couplings 80, as shown in FIGURE 1. In like manner, feed rolls 22, 24 are driven by couplings 82, 84, respectively, which couplings take the form of universal joints that are driven in accordance with the operation of apparatus A, as will be hereinafter described.

The stand drive unit or pinion stand 12, best shown in FIGURES 8 and 9, includes a housing 90 having leveler pinions 92 connected onto shafts 94 and journalled within the housing. Output stub shafts or extensions 96 of shafts 94 are drivingly connected with couplings 80 so that rotation of the pinions 92 causes similar rotation of the leveler rolls 26. An input shaft 100, the rotation of which is controlled by specific apparatus to be described later, is coupled with a pinion 102 having an output extension 104 adapted to drive feed roll 24. The pinion 102 drives an upper pinion 110. This latter pinion is keyed onto shaft 112 by an appropriate key 114. Shaft 112 includes an output extension 116 connected onto feed roll 22 through coupling 82 for driving the feed roll in accordance with the rotation of input shaft 100. Pinion 102 also drives an idler pinion 106 keyed to shaft 108 for rotating pinions 92. The operation of drive unit 12 is readily appreciated. As the input shaft 100 is rotated, extensions 104, 116 rotate the feed rolls, and at the same time the leveler rolls are rotated by shaft extensions 96.

In some cases, especially during the threading operation, it is desirable to move the feed rolls and the leveler rolls a slight amount. To accomplish this, a sprocket 120 is coupled onto extension 118 of shaft 112. A similar sprocket 122 is connected with sprocket 120 by a chain 123. Sprocket 122 is driven by an inching motor 124 through a gear reduction unit 126. To selectively couple the unit 126 with sprocket 122, there is provided an air clutch 128. During this inching operation, input shaft 100 is disengaged from the rest of the apparatus A by clutches 360, 362, to be explained later. In this manner, the inching operation does not affect the operation of the remaining components of apparatus A.

Figure 6:
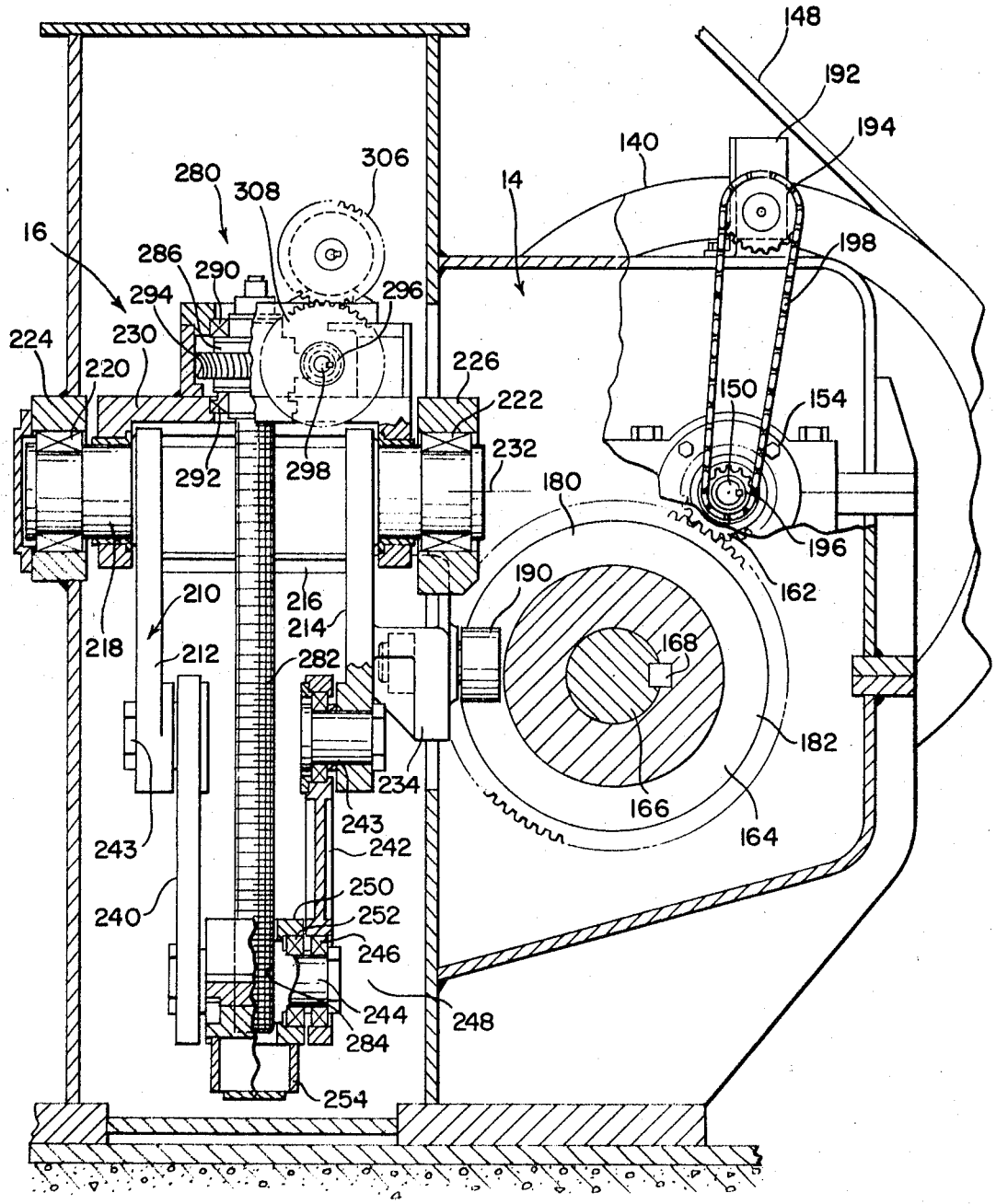
FIGURE 6 is an enlarged, cross-sectional vew taken generally along line 6—6 of FIGURE 1.

Referring now to the cam drive unit 14, best shown in FIGURES 1, 4 and 6, this unit is driven by a flywheel 140 journalled within bearings 142. A variable speed motor 144 having a pulley 146 drives the flywheel continuously by a plurality of belts 148. A main drive shaft 150 is provided with a hub 152 and is journalled within bearings 154, 156. The flywheel is rotatably mounted on hub 152 so that driving force is not exerted on the hub, and thus, the shaft 150, until a clutch 158 is engaged. This clutch is engaged by an appropriate electrical control device 159. When the clutch is disengaged, a brake 160 is actuated to stop the hub 152 and, thus, shaft 150. On shaft 150 there is a pinion 162 meshed with a second pinion 164 connected onto a cam shaft 166 by a key 168. The cam shaft is journalled in spaced bearings 170, 172 for rotation in accordance with the rotation of shaft 150.

Carried on cam shaft 166 is a cylindrical, or barrel, cam 180 having a circumferentially extending cam groove 182. The groove is somewhat elliptical in shape and extends axially of cam 180 between spaced points a, b. These points are spaced axially on the cam a distance which determines the amount of movement of a follower 190, best shown in FIGURE 6. These points are circumferentially spaced from each other on the cam 180° so that shaft 150 is rotated a sufficient amount to rotate cam 180 through an arc of 180° during each feeding cycle, to be explained later. Thereafter, the cam is again rotated 180° to bring the follower back to its original position. Consequently, the follower 190 is periodically shifted axially of the cam between points a and b.

A switch 192 is located adjacent cam 180, as shown in FIGURE 4. This switch is controlled by a sprocket 194 secured onto the switch and a sprocket 196 secured onto shaft 150. The sprockets are interconnected by an appropriate chain 198. An electrical line 200 connects the switch 192 with brake 160. In a like manner, an electrical line 202 connects switch 192 with clutch control unit 159. Assuming that the clutch 158 is energized to connect flywheel 140 with shaft 150, the clutch remains energized until cam 180 has rotated 180°. At that time, switch 192 sends signals through lines 200, 202 for disengaging clutch 158 and engaging brake 160. This immediately stops the shaft 150 after the cam 180 has rotated 180°. This completes a feed cycle of apparatus A. The next feed cycle is accomplished by an appropriate electrical signal, from means not illustrated, for again energizing clutch 158 and disengaging brake 160. A rotary cam switch on the press provides this starting signal. The cam is then rotated again 180° to bring the follower 190 to its starting position. Consequently, follower 190 is shifted in one direction a selected distance for one feed stroke and in the opposite direction the same distance for the next feed stroke. The function of this rectilinearly moving follower will be appreciated after a description of the remaining components of apparatus A.

Referring now to the lever system 16, best shown in FIGURES 5 and 6, this system includes a main lever 120 having parallel legs 212, 214 and an intermediate fixed sleeve 216 which is connected onto a shaft 218. Bearings 220, 222 rotatably mount the main lever 210 within spaced brackets 224, 226. A housing 230 is rotatably mounted upon the shaft 218, for a purpose to be hereinafter described. The shaft 218 defines a fixed pivot or axis 232 for the lever system. Secured onto one side of leg 214 there is provided a bracket 234 for transmitting motion between follower 190 and the lever system 16. Auxiliary, spaced levers 240, 242 are rotatably mounted upon the terminal end of legs 212, 214, respectively, by appropriate journals 243. At the lower end of levers 240, 242 there is provided a trunning 244 which is rotatably mounted with respect to these levers by bearings 246 and about a movable pivot point or axes 248.

Figure 7:
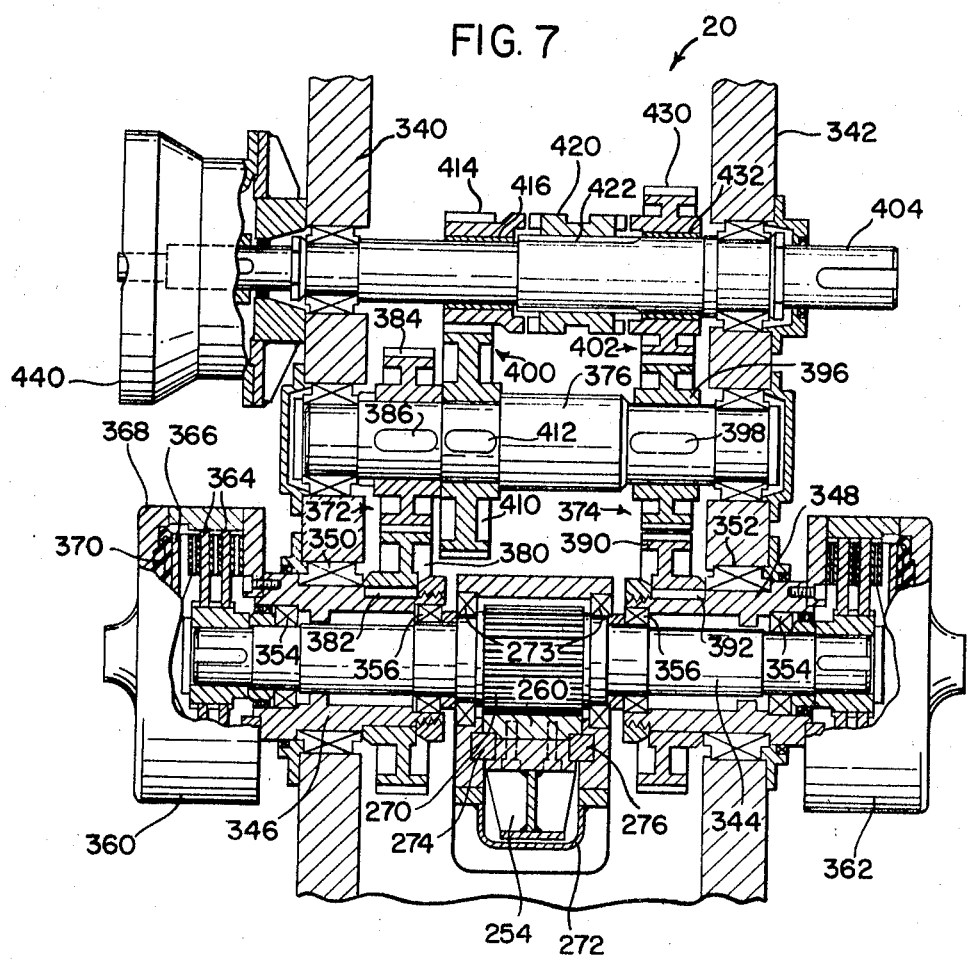
FIGURE 7 is an enlarged, cross-sectional view taken generally along line 7—7 of FIGURE 1.

Surrounding the trunnion is a rotatable sleeve 250 journalled onto the trunnion by bearings 252 which sleeve is secured onto a rack support arm 254 which carries an upwardly facing rack 260. A key 262 secures the rack longitudinally onto the arm 254 so that movement of the arm closes a corresponding movement of the rack. This rack is drivingly engaged with a pinion 270 which forms the input element of the selective drive unit 20, to be explained later. Referring temporarily to FIGURE 7, a rotatable or movable housing 272 is journalled by bearings 273 on the shaft of pinion 270, in a manner to be described later. The rack support arm 254 and the rack 260 are slidably mounted with respect to the pivotally or rotatably mounted housing 272 by transversely spaced, axially extending guides 274, 276. Briefly, as lever 210 is pivoted by follower 190 upon rotation of cam 180, the movable pivot 248 oscillates above fixed pivot 232 which causes a reciprocation of rack 260 and imparts rotary motion to pinion 270. A more detailed operation of this aspect of the invention will be described later.

Referring now again to FIGURES 5 and 6, an adjusting mechanism 280 is provided on the pivoted housing 230. This adjusting mechanism incorporates a downwardly extendng lead screw 282 which is threadably received within a bore 284 of trunnion 244. At the upper end, a nut 286 is journalled by bearings 290, 292 for rotation through a gear 294, a worm gear 296 and a shaft 298. The shaft is in turn selectively rotated by a motor 300 connected to shaft 298 by a coupling 302. Movable pivot 248 is adjusted vertically by rotation of lead screw 282 for changing the effective length of the lever system 16. This in turn changes the amount of rotation imparted by rack 260 to the pinion 270. A Selsyn indicator 304 is supported on housing 230 and is driven by gears 306, 308. The output of indicator 304 is communicated with an appropriate dial to indicate effective length of the lever system 16 and, thus, the adjusted feeding stroke of apparatus A.

The lever system 16, as explained above has certain distinct advantages over prior lever systems utilized in this type of feeding apparatus. This is best illustrated in FIGURES 11 and 12. In FIGURE 11, the operating characteristic of the prior art feeding device are illustrated. Lever 310 having the fixed pivot 312 was used to move the rack 260 for driving pinion 270. The movable pivot of these prior devices is designated 314, and the effective length of the lever was, in the prior art, adjusted by changing the position of this movable pivot. Three separate positions able pivot was in position 314a, the rack was oscillated between lines 320, 322 through an angle x. When the movable pivot was in position 314a, the rack was oscillated between lines 260a, 260b. Consequently, the angular disposition of the rack with respect to pinion 270 was varied accoridng to the position of the lever 310. This created certain increased force characteristics and distorted the velocity curve built into the cam because the lever 310 was not operating perpendicular to the rack 260 and caused excessive rotation of the rack around the pinion. In addition, inaccuracies were created because the rack was not moved the total distance of the chord of the arc defined by 314a. As mentioned above, this caused the rack to rotate around the pinion 270, and this inaccuracy in the operation of the system had to be compensated for to determine the actual feeding stroke of the apparatus.

When the movable pivot was at 314b, the rack was moved along a line 360c. In this position, perpendicularity of the rack was maintained and a uniform, minimum force was required between the lever 310 and the rack 260. Only in this one position were optimum conditions maintained. Referring now to the third position of the movable pivot, designated 314c, again the rack was not moved the total distance defined by the arc of the movable pivot. This created the differential in forces and inaccuracies in the feed stroke, mentioned before. Since the prior lever system did not provide uniformity in the feeding operation, the stroke of the apparatus was not a straight line function of the effective length of lever 310. For this reason, distorted scales and other arrangements had to be utilized for determining the adjustment of lever 310 for obtaining various feeding strokes.

The above-mentioned disadvantages of the prior feeding lever systems are overcome by the present invention wherein the movable pivot or axis 248 is shifted along an arc which optimizes the operating characteristics of lever system 16. This art is constructed graphically by assuming three positions of the rack 260 with respect to pinion 270. These three positions are designated 260′, 260″, and 260‴. These lines should be generally within the range of operation of lever system 16. After these lines are located, construction lines 330, 332, 334 are drawn through fixed pivot or axis 232 and perpendicular to the previously mentioned rack movement lines. This locates the center position of the rack during oscillation of the lever system. Then, arcs defining the operating angle of the lever system are laid out with fixed pivot 232 being the center. This provides two intersection points which each of lines 260′, 260″, and 260‴. The lower intersection points, designated 248′, 248″, and 248‴ are then obtained. The arcuate path 336 is constructed using these three points. Thereafter, the length of the main lever 210 and the auxiliary levers 240, 242 are selected so that movement of the levers by lead screw 282 causes the movable pivot 248 to substantially correspond with the optimum arcuate path 336. Of course, the lead screw 282 rigidifies the lever system by making a triangular structure.

By constructing the lever system 16 in this manner, movement of the lever system will cause the rack to move substantially along a given line irrespective of the adjusted effective length of the lever system. In addition, as can be seen in FIGURE 12, the distance of the movable pivot 248 from the fixed pivot 232 is a straight line function of the actual linear movement of the rack 260. Consequently, the adjusted position of lead screw 282 which extends between the fixed pivot and the movable pilot accurately determines the angular distance through which the pinion 270 is rotated by rack 260 for any particular setting of the lever system. This lever system generally operates in a perpendicular manner with respect to the rack 260 which minimizes the forces between the lever system and the rack and prevents distortion of the velocity curve. This arrangement overcomes the disadvantages of the system schematically illustrated in FIGURE 11, which is representative of the prior art lever driven strip feeding mechanisms.

The last component of apparatus A is the selective driving unit 20 which incorporates various novel features that improve the operating characteristics of apparatus A. Ths unit is best shown in FIGURES 5 and 7, and it includes spaced frame members 340, 342 between which extends a shaft 344 driven by pinion 270 through rack 260. Spaced quills 346, 348 are supported by journals 350, 352 within the frame members. Within the quills, the shaft 344 is journalled by bearings 354, 356. On opposite ends of this shaft there are provided selectively energizable clutches 360, 362 which connect the shaft alternately with quills 346, 348, for a purpose to be described later. Since the clutches 360, 362 are substantially identical, only one clutch 360 will be described, and this description will apply equally to the other clutch. Clutch 360 includes a plurality of inner plates 364 connected onto shaft 344 and an outer friction plate 366 connected to clutch housing 368. A fluid operator in the form of an expandable fluid chamber 370 is provided within clutch 360. By energizing the clutches 360, 362, the shaft 344 is selectively connected onto the respective quills.

A forward drive train 372 and a reverse drive train 374 connect the quills 346 and 348, respectively, with an intermediate shaft 376. Train 372 includes a pinion 380 secured onto quill 346 by a key 382 and a pinion 384 keyed onto shaft 376 by a key 386. In a like manner, train 374 includes a pinion 390 secured onto quill 348 by a key 392, an idler or reverse pinion 394, and a pinion 396 secured onto shaft 376 by a key 398. As rack 260 moves in one direction, clutch 360 is energized to drive shaft 376 in a forward, feeding direction. As the rack is moved in the opposite direction, clutch 362 is energized so that the shaft 376 is driven through the reverse drive train 374 to turn the shaft 376 in the same direction as before. Consequently, there is a feeding stroke on both movements of the rack. Identity of rotation is obtained by the use of a second drive train and selectively operated clutches. The clutches are operated electrically, by appropriate means not described.

In order to provide a wide range of feeding strokes, there are provided two separate drive trains 400, 402 between the intermediate shaft 376 and the output shaft 404. The first driven train 400 is utilized for longer strokes. This train includes a relatively large pinion 410 secured onto shaft 376 by a key 412. Pinion 410 engages a relatively small pinion 414 journalled on shaft 404 by a sleeve bearing 416. Dog clutch 420 is slidable axially on spline 422 of shaft 404 so that it may be moved to the left to couple pinion 414 with the output shaft. Since pinion 410 is substantially larger than pinion 414, shaft 404 rotates a greater number of turns than shaft 376 to provide increased amount of rotation of the feed rolls 22, 24.

Referring now to the second drive train 402, this train includes the previously mentioned pinion 396 and a pinion 430 rotatably mounted upon shaft 404 by a sleeve bearing 432. When dog clutch 420 is moved to the right, the gear train 402 is actuated. Since the pinions 396 and 430 are substantially identical in size, the shaft 404 will rotate substantially the same number of turns as shaft 376 when the train 402 is connected. It is appreciated that the movement back and forth of the dog clutch 420 changes the length of the feed stroke. This stroke is also adjusted by changing the effective length of the lever system 16. Consequently, a substantially increased range of feed strokes is accomplished by providing the two drive trains 400, 402. The dog clutch is movable by a manually operated lever 434 through an operating yoke 436. Lever 434 is maintained in a neutral position, shown in FIGURE 7, or the long or short stroke position by a detent 348. To prevent overrunning of shaft 404, the brake 440 is provided at the opposite end of this shaft. Of course, shaft 404 is directly connected with coupling 130 to operate the stand drive unit 12 in a manner previously described.

Further details of the operation of apparatus A are not necessary since they have been described in connection with each of the separate components which are connected in a manner mentioned in the specification and as clearly shown in the drawings.

Figure 13:
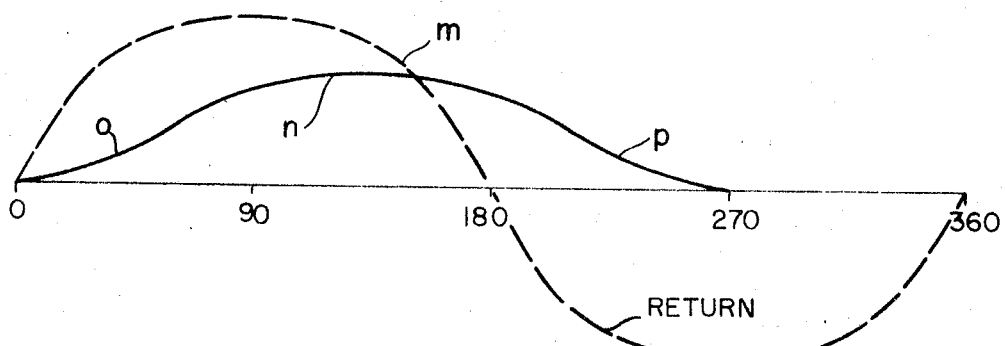

Referring now to FIGURE 13, an operating characteristic of the present invention is illustrated. The cam 180 is started and stopped by connecting the cam with flywheel 140. This would, under normal circumstances, provide reciprocal motion to rack 260 in accordance with curve $m$ which is a velocity curve plotted with respect to a press cycle. The amount of feed is generally the area below the curve $m$ on the first half cycle. The linear length of the curve $m$ on the second half cycle represents the time required, in relation to a press cycle, for returning the rack in the prior art. In some prior art, a rapid return mechanism is used which provides a short second half of curve $m$. This causes a high maximum velocity and acceleration for this return half cycle. By providing the reversing function of drive unit 20, the velocity curve of the shaft 100 generally takes the form of curve $n$ representing a single feeding cycle. By contouring the cam 180, the curve $n$ may be modified so that there is provided a gradual initial portion $o$ and a gradual terminal portion $p$. By providing these gradual portions on the operating curve $n$, abrupt velocity changes are not created with the resulting abrupt and un-uniform starting and stopping of the feeding cycle or stroke. The curve $n$ is repeated upon each cycle, or 180° rotation, of the cam 180. It is noted that curve $n$ has an area generally equal to the area below the first half of curve $m$ with a lower maximum velocity and acceleration; therefore, each cycle of cam 180 provides basically the same feed stroke as provided by the prior art curve $m$ without the same inherent velocity and acceleration peaks. Also, as shown in curve $n$, a large portion of the press cycle may be used for feeding strip. The cam 180 is contoured to provide the velocity curve $n$, as depicted in FIGURE 13.

Having thus described my invention, I claim:

1. In a device for feeding strip in rapidly repeating feed distances along a feed line, said device including two spaced feed members with one on each side of said strip, said members frictionally engaging said strip, means for repeatedly driving said members a given distance to feed said strip, and means for adjusting said given distance to adjust said feed distances, the improvement comprising: said driving means comprising a driven rotatable element, means for drivingly connecting said element with said members with rotation of said element through a given angle driving said members a given distance corresponding to said feed distance; a lever system including a fixed pivot, a movable pivot, means for adjusting said movable pivot along an arcuate path with respect to said fixed pivot to change the effective lever arm of said lever system to change said feed distance; means for oscillating said lever system about said fixed point whereby said movable pivot moves through an arc dependent upon the lever arm of said lever system; and, rack means for driving said driven rotatable element by said movable pivot a distance dependent upon the arc of said movable pivot on oscillation of said lever system, said arcuate path being defined by three points, each of said points being dependent on a different adjusted position of said movable pivot and being located to provide generally perpendicular operation of said rack means in said adjusted positions.

2. The improvement as defined in claim 1 wherein said pinion is rotatable in a first direction when said movable pivot oscillates in a first direction and in a second direction when said movable pivot oscillates in a second direction, and said means connecting said pinion with said feed members comprising a first element driven direct by said pinion, a second element drivingly connected to said feed members, a forward drive train, a reverse drive train, means for selectively connecting said forward drive train between said first and second elements when said movable pivot oscillates in its first direction, and means for selectively connecting said reverse drive train between said first and second elements when said movable pivot is oscillated in said second direction whereby said second element is driven in the same direction irrespective of the oscillating direction of said movable pivot.

3. In a device for feeding strip in rapidly repeating feed distances along a feed line, said device including two spaced feed members with one on each side of said strip, said members frictionally engaging said strip, means for repeatedly driving said members a given distance to feed said strip, and means for adjusting said given distance to adjust said feed distances, the improvement comprising: said driving means comprising a pinion, means for drivingly connecting said pinion with said members with rotation of said pinion through a given angle driving said members a given distance corresponding to said feed distance; a lever system including a fixed pivot, a movable pivot, means for adjusting said movable pivot along an arcuate path with respect to said fixed pivot to change the effective lever arm of said lever system to change said feed distance; means for oscillating said lever system about said fixed pivot whereby said movable pivot moves through an arc dependent upon the lever arm of said lever system; and, means for driving said pinion by said movable pivot a distance dependent upon the arc of said movable pivot on oscillation of said lever system, said pinion being rotatable in a first direction when said movable pivot oscillates in a first direction and in a second direction when said movable pivot oscillates in a second direction, and said means connecting said pinion with said feed members comprising a first element driven direct by said pinion, a second element drivingly connected to said feed members, a forward drive train, a reverse drive train, means for selectively connecting said forward drive train between said first and second elements when said movable pivot oscillates in its first direction, and means for selectively connecting said reverse drive train between said first and second elements when said movable pivot is oscillated in said second direction whereby said second element is driven in the same direction irrespective of the oscillating direction of said movable pivot, said means for connecting said pinion with said feed members also includes means for changing the ratio of movement between said first and second elements.

4. The improvement as defined in claim 3 wherein said ratio changing means comprises a third element in said means for connecting said pinion with said feed members, a third and a fourth drive train selectively connected between said second and third elements, said third and fourth drive trains having substantially different movement ratios, clutch means for selectively activating said third and fourth drive trains to change the movement ratios between said second and third elements, and said third element being drivingly connected with said feed members.

5. In a device for feeding strip in rapidly repeating feed distances along a feed line, said device including two spaced feed members with one on each side of said strip, said members frictionally engaging said strip, means for repeatedly driving said members a given distance to feed said strip, and means for adjusting said given distance to adjust said feed distances, the improvement comprising: said driving means comprising a driven rotatable element, means for drivingly connecting said element with said members with rotation of said element through a given angle driving said members a given distance corresponding to said feed distance; a lever system including a fixed pivot, a movable pivot, means for adjusting said movable pivot along an arcuate path with respect to said fixed pivot to change the effective lever arm of said lever system to change said feed distance; means for oscillating said lever system about said fixed pivot whereby said movable pivot moves through an arc dependent upon the lever arm of said lever system; and, means for driving said driven rotatable element by said movable pivot a distance dependent upon the arc of said movable pivot on oscillation of said lever system, said oscillating means comprising a cam having a cam surface and a follower connected with said lever assembly and riding along said cam surface, means for moving said cam to cause said follower to move in a first direction to oscillate said lever system about said fixed pivot.

6. The improvement as defined in claim 5 wherein said cam moving means causes said cam to move said follower in a second direction after movement in said first direction, and means connecting said rotatable element with said feed members, said connecting means including means for driving said feed members in a given direction upon movement of said follower in both said first and second directions.

7. The improvement as defined in claim 5 wherein said cam surface is contoured to provide a velocity curve of said follower movement, said velocity curve having a gradual initial portion.

8. The improvement as defined in claim 7 wherein said velocity curve has a gradual terminal portion.

9. In a device for feeding strip in rapidly repeating feed distances along a feed line, said device including two spaced feed members with one on each side of said strip, said members frictionally engaging said strip, means for repeatedly driving said members a given distance to feed said strip, and means for adjusting said given distance to adjust said feed distances, the improvement comprising: said driving means comprising a driven rotatable element, means for drivingly connecting said element with said members with rotation of said element through a given angle driving said members a given distance corresponding to said feed distance; a lever system including a fixed pivot, a movable pivot, means for adjusting said movable pivot along an arcuate path with respect to said fixed pivot to change the effective lever arm of said lever system to change said feed distance; means for oscillating said lever system about said fixed pivot whereby said movable pivot moves through an arc dependent upon the lever arm of said lever system; and, means for driving said driven rotatable element by said movable pivot a distance dependent upon the arc of said movable pivot on oscillation of said lever system, said adjustable means including a lead screw device on said lever system having a nut connected to one of said pivots and a lead screw connected to the other of said pivots, and means for rotating said lead screw to move said movable pivot along said arcuate path.

10. In a device for feeding strip in rapidly repeating feed distances along a feed line, said device including two spaced feed members with one on each side of said strip, said members frictionally engaging said strip, means for repeatedly driving said members a given distance to feed said strip, and means for adjusting said given distance to adjust said feed distances, the improvement comprising: said driving means comprising a driven rotatable element, means for drivingly connecting said element with said members with rotation of said element through a given angle driving said members a given distance corresponding to said feed distance; a lever system including a fixed pivot, a movable pivot, means for adjusting said movable pivot along an arcuate path with respect to said fixed pivot to change the effective lever arm of said lever system to change said feed distance; means for oscillating said lever system about said fixed pivot whereby said movable pivot moves through an arc dependent upon the lever arm of said lever system; and, means for driving said driven rotatable element by said movable pivot a distance dependent upon the arc of said movable pivot on oscillation of said lever system, said lever system including a first lever pivotally mounted on said fixed pivot and having a terminal end, a second lever connected to said terminal end and having said movable pivot provided thereon, and said adjusting means including a mechanism on said lever system extending between said pivots to rigidify said lever system.

11. In a device for feeding strip in rapidly repeating feed distances along a feed line, said device including two spaced feed members with one on each side of said strip, said members frictionally engaging said strip, and means for repeatedly driving said members a given distance to feed said strip, the improvement comprising: said driving means including a driven first element, means for driving said first element successively in opposite directions a selected distance corresponding to the given feed distance, a second element drivingly connected to said feed members, a forward drive train, a reverse drive train, and means for selectively interposing said forward and reverse drive trains between said first and second elements in accordance with the direction of movement of said first element whereby said second elements repeatedly move in the same direction, said first element having a pinion and said means for driving said first element is a rack engaged with said pinion and means for reciprocating said rack to oscillate said pinion, said means for reciprocating said pinion is a lever system having a fixed pivot and a movable pivot, said movable pivot being connected to said rack and means for oscillating said lever system, and said oscillating means includes a cam having a surface and a follower engaging said surface and connected onto said lever system, and means for moving said cam to cause oscillation of said follower by said cam surface.

12. The improvement as defined in claim 11 wherein said cam surface is generally cylindrical and traces an axially shiftable closed path and means for rotating said cam.

13. In a device for feeding strip in rapidly repeating feed distances along a feed line, said device including two spaced feed members with one on each side of said strip, said members frictionally engaging said strip, and means for repeatedly driving said members a given distance to feed said strip, the improvement comprising: said driving means including a driven first element, means for driving said first element successively in opposite directions a selected distance corresponding to the given feed distance, a second element drivingly connected to said feed members, a forward drive train, a reverse drive train, and means for selectively interposing said forward and reverse drive trains between said first and second elements in accordance with the direction of movement of said first element whereby said second elements repeatedly move in the same direction, and a movement ratio changing mechanism between said second element and said feed members and means for changing the movement ratio of said mechanism.

14. The improvement as defined in claim 13 wherein said mechanism includes third and fourth drive trains between said second element and said feed members, said third and fourth trains having substantially different movement ratios and means for selectively activating said third and fourth trains to change said movement ratio.

References Cited

UNITED STATES PATENTS

| | | | |
|---|---|---|---|
| 2,819,070 | 1/1958 | Herr | 226—141 |
| 3,076,368 | 2/1963 | Groll | 226—139 X |
| 3,099,180 | 7/1963 | Munschauer | 226—154 X |

M. HENSON WOOD, Jr., Primary Examiner

RICHARD A. SCHACHER, Assistant Examiner

U.S. Cl. X.R.

226—156